Sept. 25, 1945. P. A. STURTEVANT 2,385,591
FORCE TRANSMITTING MEASURING MECHANISM
Filed July 17, 1944 3 Sheets-Sheet 1
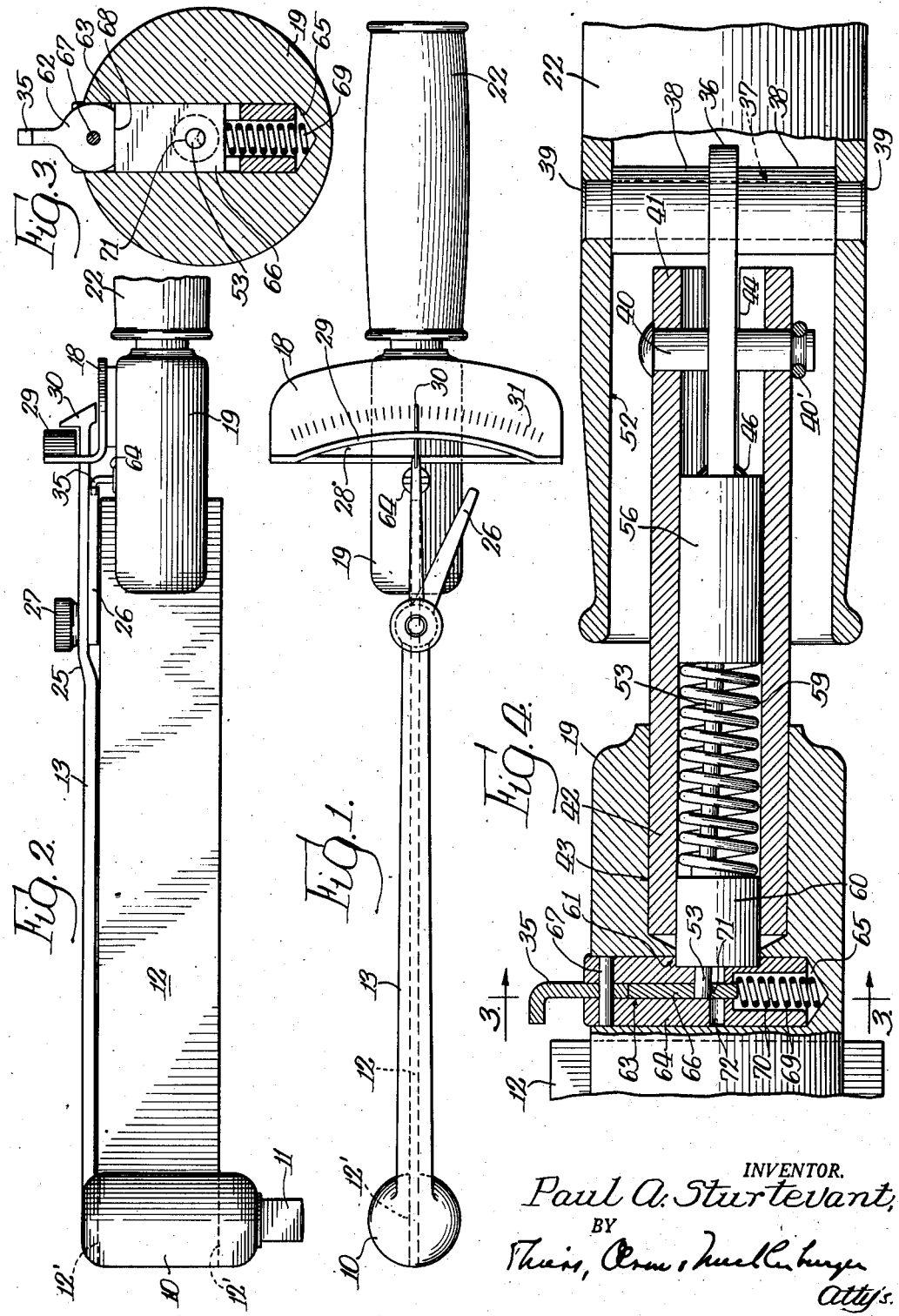
INVENTOR.
Paul A. Sturtevant,
BY
Theis, Olsen, Mecklenburger
Atty's.

Sept. 25, 1945. P. A. STURTEVANT 2,385,591
FORCE TRANSMITTING MEASURING MECHANISM
Filed July 17, 1944 3 Sheets-Sheet 2
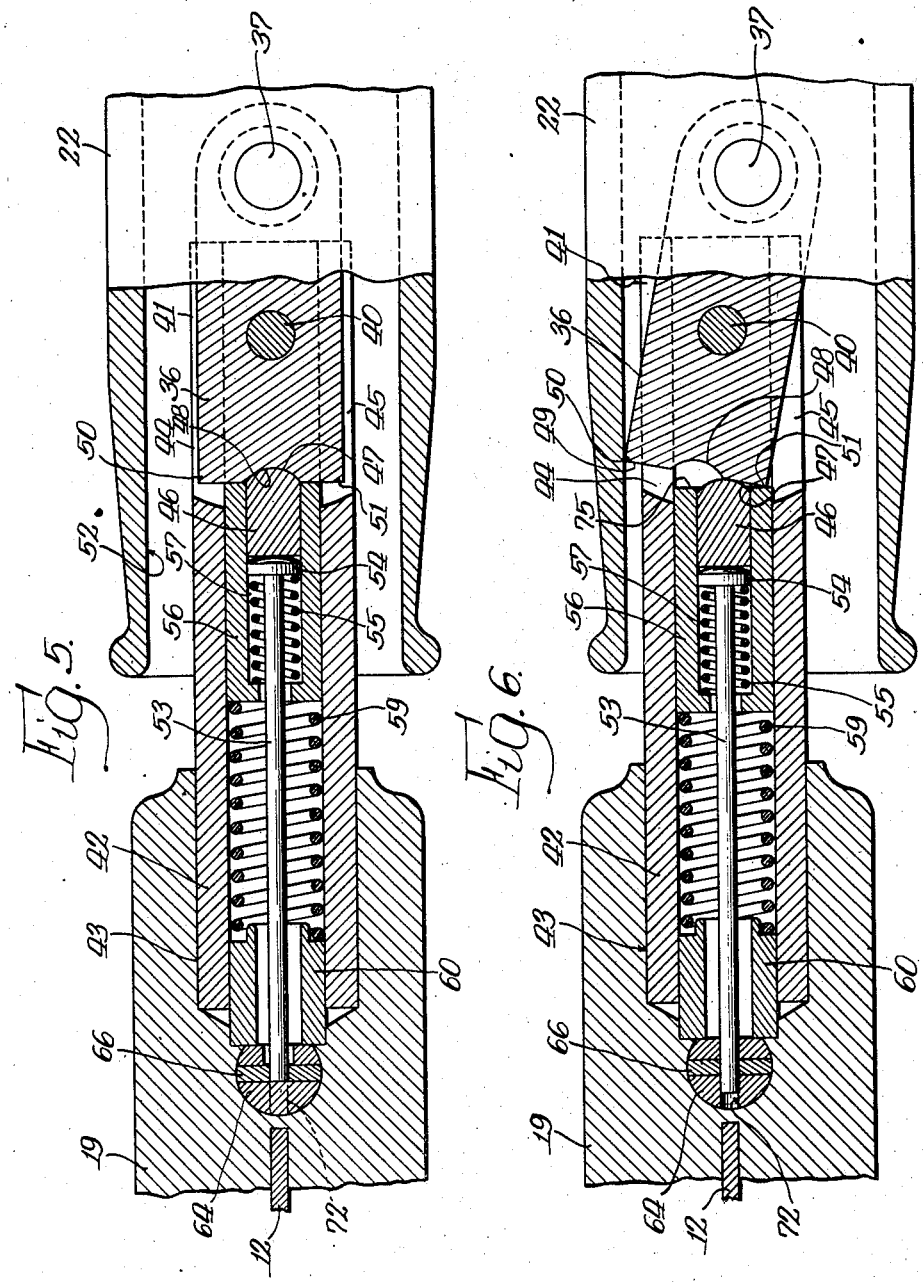

Sept. 25, 1945.  P. A. STURTEVANT  2,385,591
FORCE TRANSMITTING MEASURING MECHANISM
Filed July 17, 1944  3 Sheets-Sheet 3
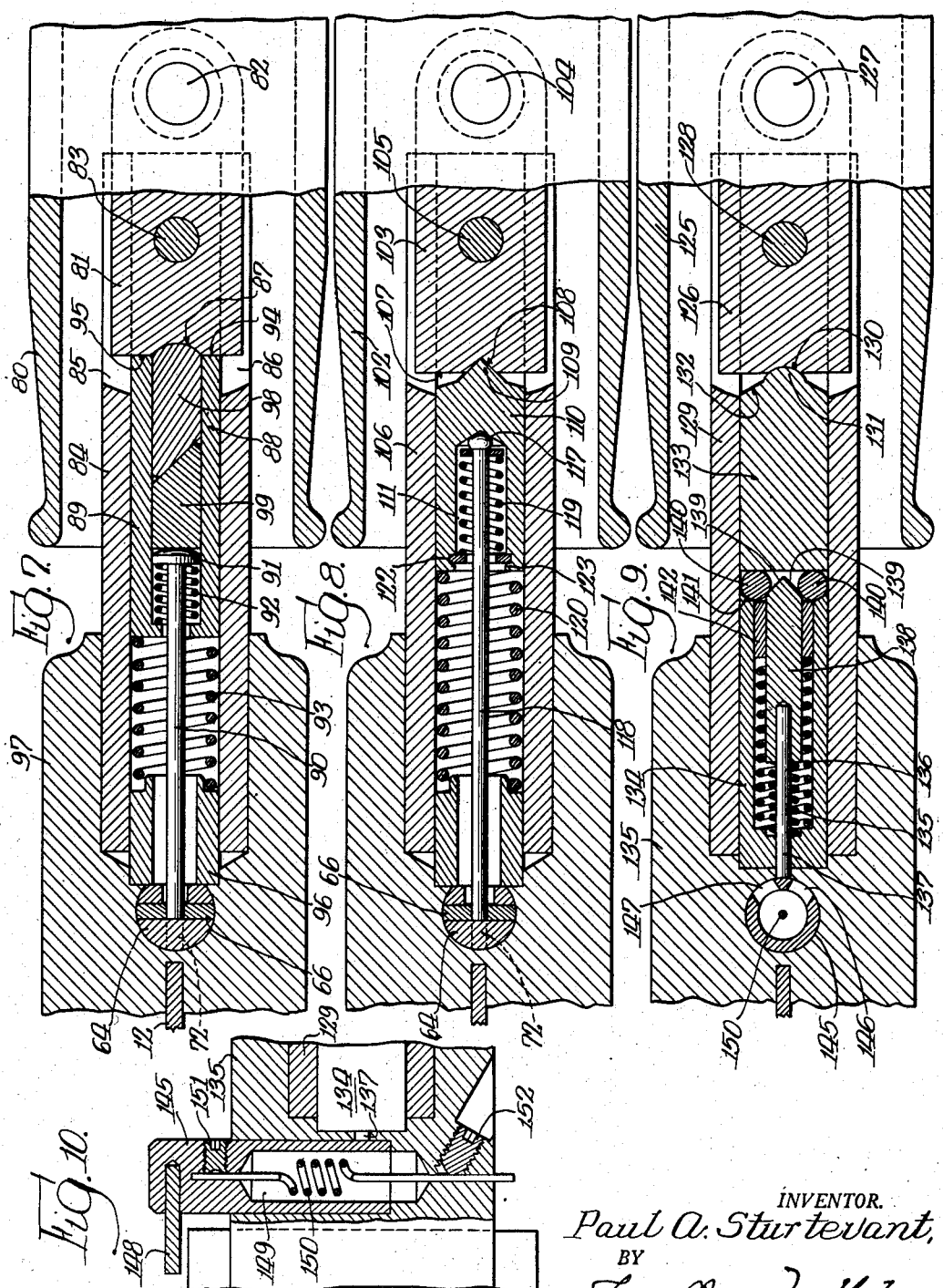
INVENTOR.
Paul A. Sturtevant,
BY
Veuss, Orne & Mecklenburg
attys.

Patented Sept. 25, 1945

2,385,591

UNITED STATES PATENT OFFICE 2,385,591

FORCE TRANSMITTING MEASURING MECHANISM

Paul A. Sturtevant, Elmhurst, Ill.

Application July 17, 1944, Serial No. 545,333

26 Claims. (Cl. 73—139)

This invention relates to force transmitting mechanism and more particularly to a mechanism of this type employing a force applying member.

When applied to mechanism of this type, the invention broadly has to do with a force limiting structure employing two relatively movable parts and a normally rigid connection between the two parts for transmitting the force applied, there being means to release the connection and to utilize this force to create a hammer blow against the structure in order to indicate the application of a predetermined force at the work.

In this connection, the invention has for its object the creation of a hammer blow substantially equal to the force being imparted whereby a definite signal is produced by this hammer blow and the parts are automatically resettable for subsequent operation when the force being applied is released.

While the invention has application broadly to a force transmitting mechanism for limiting the force being applied, it is uniquely adaptable to a structure of the type for measuring torque employing a torque measuring device operatively disposed relative to a work-engaging member and to a force applying member.

The invention may be specifically applied to a torque measuring wrench having a work-engaging member, a head member and a spring operatively disposed relative to the same so that when the handle is grasped and rotated in an arc in either direction, the force applied at the handle is transmitted to the work. As the resistance of the work causes the spring to flex, the head member and the handle rotate relative to the work-engaging member. The force applied at the handle continues to move the head and handle in an arc with the work-engaging member as a pivot as the work is tightened. This rotary or pivotal movement between the head member and the work-engaging member may be measured at a dial by a pointer. The reading of the dial correctly represents, in the construction of the wrench disclosed herein, the force or torque applied by the work-engaging member to the work.

In practice, the purpose of a torque measuring wrench to apply a predetermined torque to nuts, bolts, studs or the like and to secure thereby uniform tightening has often failed due to the carelessness of the operator and to the use of the wrench in locations making the reading of its dial difficult. In an effort to overcome these difficulties, provisions have been made to warn the operator by visible and audible signals upon the application of a predetermined torque at the work-engaging member. Aside from giving a signal, prior art suggestions of this kind have been ineffective to accomplish the result intended due to the fact that the structures used permitted the attendant to disregard the signal and continue to apply a force at the handle member. These structures usually required electrical energization so that electric cords running to the wrench were necessary. The running of electric cords to a torque wrench has always been objectionable because these cords limit the maneuverability of the wrench in close spaces and quickly wear, the result being that the cords were soon disconnected and discarded. On the other hand, the character of the structure resulted in a weak and ineffective signal, which, if audible could not be readily heard in a factory, and, if visible, could not always be seen when the wrench would be used. Power operated devices, as distinguished from manually operable devices, have suggested the employment of means to disconnect the driving power from the work-engaging member when a predetermined torque is applied and to rely upon a vibration or clicking of the parts to indicate to the operator that the power is disconnected. The arrangement of the parts did not effectively accomplish the result desired because the continued operation of the power unit would detract from the clicking which was remotely disposed from the handle and would permit the operator to keep the device nosed against the work and apply excessive force to overcome the disconnection. Under no circumstances was this arrangement adaptable to a torque transmitting device employing a handle because the application of power was beyond and not through the handle, the latter merely being used to guide the device in its use.

An object of the invention is to provide, therefore, in a torque measuring wrench or in any force transmitting mechanism, a new and novel means preferably forming a part of a connection transmitting the force to the work-engaging member and including a releasable part adapted to impart a hammer blow to indicate the application of a predetermined torque at the work-engaging member.

A further object of the invention is to provide in a device of the type described an improved form of connection between what may be termed the handle and the head member whereby a normally rigid connection is provided to transmit the force applied at the handle by the operator until a predetermined torque is applied at the work-engaging member whereupon the connection is momentarily broken and the force is utilized to create a hammer blow capable of being equal to the force being applied to the handle.

A still further object of the invention is to provide a structure of the foregoing type adapted effectively to indicate by a hammer blow that a predetermined torque has been applied to the work-engaging member. The operator cannot disregard, therefore, the setting of the wrench and will not carelessly continue applying force at the handle in excess of the setting on the wrench. Moreover, the wrench may be used in any position or location and a reading of the dial or gauge will not be necessary in order to determine the force applied. A structure embodying the invention effectively jars the operator at the handle by the hammer blow and avoids continuing the application of force through the handle.

A still further object of the invention is to provide a structure of the foregoing type employing a novel form of connection between the handle member and the head member, this connection including preferably a part normally held against relative movement with the head member to form a rigid connection therewith but releasable by a trigger device requiring for operation but a negligible part of the force imparted to the handle whereby the rigid connection may be momentarily broken and the part caused to move relative to the head member and impart a hammer blow equal to the force applied to the handle.

The invention in its more specific aspects may include a trigger device operable by the indicating means registering the torque applied at the work-engaging member, which trigger device is adapted normally to maintain a rigid connection at the head member to transmit the force applied at the handle, but, when actuated by the indicating means, to break the rigid connection so that the force applied at the handle by the operator is then utilized to create a hammer blow against the handle. The trigger device is designed to require little force to operate the same and to be quickly resettable automatically so as to restore the rigid connection when the force is released from the handle.

A further novel feature of this invention is that any wearing of the parts of the connection, including the releasable member, will not affect the operation of the torque wrench. The flexing of the spring bar and the action of the indicating mechanism to indicate the extent of such flexing are independent in their operation of any frictional influence resulting from such wearing of the parts. Moreover, the time of the trip releasing the connection will not be affected by such friction inasmuch as the trip finger is set in relation to the visual reading at the dial.

Other objects and advantages of the invention will be apparent from the following description when taken in connection with the accompanying drawings which form a part hereof.

In the drawings:

Figure 1 is a top elevational view of a torque measuring wrench embodying the invention;

Fig. 2 is a side view of the wrench with a portion of the handle broken away;

Fig. 3 is a transverse view of the trigger device taken along line 3—3 of Fig. 4;

Fig. 4 is an enlarged vertical section of that portion of the wrench which embodies the structure of the invention disclosed;

Fig. 5 is a similar but horizontal section of the same structure, the releasable part being shown in a non-movable position with the head member and forming a part of the rigid connection transmitting the force applied at the handle member;

Fig. 6 is the same sectional view but showing the releasable part tripped and striking the handle member to produce a hammer blow thereat;

Fig. 7 is a view similar to Fig. 5, but illustrating a slightly modified structure;

Fig. 8 is likewise a view similar to Fig. 5, but illustrating another modified structure;

Fig. 9 is a similar view, but illustrating a still further modified structure; and Fig. 10 is a transverse section through a modified form of trigger device shown in Fig. 9.

The wrench illustrated in Figs. 1 to 6, inclusive, includes a work-engaging member 10, a head member 19 and a handle 22. A flat spring bar 12 is so disposed with respect to the work-engaging member 10 and the head 19 that when the handle 22 is grasped and rotated in an arc in either direction, the pressure applied is transmitted through head 19, spring 12 and the work-engaging member 10 to the work. As the resistance of the work causes the spring bar 12 to flex, head 19 and handle 22 will rotate relative to the work-engaging member 10. The force applied to the handle 22 will continue to move the handle in an arc with the work-engaging member 10 as a pivot as the work is tightened. This rotary or pivotal movement between the handle 22 and the work-engaging member 10 is measured at a dial 18 mounted upon head 19 by a pointer 13 secured to the work-engaging member 10.

It will be observed that in the type of wrench disclosed, applicant provides two relatively movable members which are so arranged that one of them operatively engages the work and is known as the work-engaging member. The other member is the handle or head member and the relative movement between the work-engaging member and the handle or head member is yieldably opposed by a flat spring bar. The force applied through the wrench is determined by measuring the extent of the relative movement between these two parts. The spring bar has one end extending across the axis of rotation of the work-engaging member as indicated by dotted lines 12' in Figs. 1 and 2, this spring bar then extending rearwardly therefrom longitudinally of the handle member in radial relation to the axis of rotation of the work-engaging member and the other end being pivotally connected to the head. This arrangement of the parts provides a substantially continuous moment arm of substantially constant length.

It will be observed that the pointer 13 may be fixedly secured to the work-engaging member 10 so that it may appear to be an integral part thereof. It may taper however and be offset upwardly at 25 to provide sufficient space above spring bar 12 for a trigger finger 26 adapted to be adjustably carried by pointer 13 by means of an adjusting screw 27. The tip of pointer 13 passes through an arcuate slot or cut-away portion 28 on dial 18 formed by bending part 29 in an arc to protect the pointer 13 and its tip 30. The scale reading 31 is calibrated in foot pounds, or according to any desired terms, so that when torque represented by a predetermined reading on dial 18 is applied through handle 22, head 19, spring bar 12 and work-engaging member 10, the relative rotative movement of the head member 19 and handle 22 about work-engaging member 10 as a pivot through the deflection of spring bar 12 will bring pointer tip 30 to this predetermined reading and cause trigger finger 26 to engage and trip a trigger 35 projecting upwardly from head 19.

The actuation of trigger 35 is for the purpose of releasing a normal rigid connection with head member 19 that functions to transmit the force applied to handle 22. This connection comprises in the specific illustration disclosed a releasable bar 36 that is pivotally mounted upon pin 37 carrying spacer sleeves 38 disposed on opposite sides of bar 36 to keep the same centered, the pin 37 being horizontally anchored in handle 22 as indicated at 39. Bar 36 is also mounted in pivotal relation upon pin 40, which lies parallel to pin 37 but is anchored in the horizontally bifurcated end 41 of a sleeve extension 42 fixedly anchored at 43 in head member 19 and forming in fact a functionally integral part of head member 19. Bar 36 is adapted to be so disposed with respect to this bifurcated end 41 that it will normally lie across the same with its side edges disposed along or within the bifurcated openings 44 and 45. The rigid connection is normally maintained by a trip member 46 having its curved forward end 47 engaging in a correspondingly curved notch 48 (which may be pointed as will hereinafter appear) in the forward end 49 of bar 36, the latter part having end edges 50 and 51, which, as will be explained, are adapted to strike the inside surface 52 of handle 22 when this rigid connection is broken.

One possible form of mechanism for holding trip member 46 socketed in notch 48 of bar 36 to restrain the bar 36 from normally moving relative to sleeve 42 is illustrated in Figs. 4 to 6, inclusive. A spring pressed rod 53 with a head 54 and a coil spring 55 pressing the head 54 forwardly against trip 46 extends rearwardly of this trip 46, the head 54 and spring 55 lying in a smaller sleeve 56 slidably disposed in sleeve extension 42. Spring 55 is confined in a chamber 57 while trip 46 lies in the forward end of this chamber with the head 54 of rod 53 pressing thereagainst and tending to expel the trip outwardly, this action being restrained by the notch 48 during the time the rigid connection is maintained, as shown in Fig. 5, or by a portion of outer face 49 of bar 36, when the rigid connection is broken as shown in Fig. 6. When the rigid connection is broken, a portion of the outer face 49 will push the trip 46 inwardly against the tension of spring 55, the latter being compressed as shown in Fig. 6. This portion of outer face 49 of bar 36 will also slidably force sleeve 56 inwardly in sleeve extension 42 to compress a spring 59 of larger diameter lying between sleeve 56 and a fixed tubular member 60 anchored in sleeve extension 42 and extended in head member 19.

Trigger 35 may in one possible embodiment of the invention comprise a pivotally mounted cam member 62 lying in a slot 63 disposed centrally in a cylindrical housing 64 which is held in an opening 65 formed in head member 19 by tubular member 60 lying in a cutaway portion 61 as shown in Figs. 4 and 6. Slot 63 may extend a substantial distance downwardly in housing 64, as shown in Figs. 3 and 4, so that an apertured shuttle plate 66 may be disposed for slidable movement below trigger cam member 62. This cam member 62 is adapted to be pivotally carried on a pin 67 driven transversely through housing 64. A flat cam face 68 on cam member 62 functions to bear against the upper face of shuttle plate 66, which is adapted normally to be pressed upwardly against this cam face 68 by a coil spring 69 disposed in a lower chamber 70 in housing 64 and into which the plate 66 projects for engagement by the coil spring 69.

It will be observed in Figs. 3 and 4 that the tip of rod 53 normally lies in an aperture 71 in plate 66. When the trigger 35 is engaged by finger 26 and its cam member is caused to rotate about pin 67, cam face 68 will depress plate 66 and bring aperture 71 into alignment with an opening 72 in housing 64. When this occurs, the tip of rod 53 will be forced forwardly to move into opening 72 by the force being applied at the handle, which force is of course transmitted by these parts to the head member 19. Thus the rigid connection is broken and force being applied at handle 22 is utilized to swing bar 36 in a hammer blow action against the inside surface 52 of the handle. It will be apparent that this hammer blow may be equal to the force imparted to the handle by the operator and that its striking effect will be of a magnitude to be definitely imparted by a jarring action to the operator and leave no doubt about the predetermined torque represented by the setting of trigger finger 26 being imparted to the work by the work-engaging member 10. Thus, with the impact action equal to the force imparted to the handle by the operator, the rigid connection between the handle and the head member is temporarily broken, but will be quickly restored by the tendency of the parts automatically to reset when the force imparted to the handle is released.

When the handle 22 is grasped and rotated in either direction, the pressure applied will be transmitted through the head 19, spring bar 12 and the work-engaging member 10 to the work. As the resistance of the work causes the spring 12 to flex, relative rock movement takes place between the head 19 and work-engaging member 10 and the amount of the force applied may be measured by the extent of this rock movement through the pointer 13 and gauge dial 18. If the handle 22 is to be rotated clockwise as viewed in Fig. 1, trigger finger 26 is set to engage the trigger 35 when a predetermined torque is applied to the work as determined by this relative rock movement between head 19 and work-engaging member 10. This will effect a release of part 36 so that it will swing to the position shown in Fig. 6, to-wit: with corner 50 striking handle wall 52 and with a portion of face 49 forcing trip 46 inwardly to compress springs 54 and 59 and hold rod 53 in opening 72 in housing 64.

The feature of automatic resetting of the parts to restore the rigid connection is obviously accomplished once the force applied to the handle is discontinued. The spring bar 12 will then straighten to return trigger finger 26 to a position away from the trigger 35, and the pivotal action of handle 22 about pin 37 together with the pivotal mounting of bar 36 on pin 40 will cause this handle to straighten, this bar 36 also straightening by reason of its double pivotal mounting at 37 and 40, so that the portion of face 49 of bar 36 will no longer abut against trip 46. Spring 55 will then move rod 53 to withdraw its tip from opening 72 in housing 64, whereupon spring 69 in chamber 65 in head 19 will lift shuttle plate 66 to the position shown in Fig. 4 and the trigger cam plate 62 will assume its normal position shown in Fig. 3. Trip 46 will be forced into notch 48 in bar 36 and the forward face 75 of sleeve 56 will be brought and held against face 49 of bar 36. Thus the rigid connection is effectively restored by a tendency of the parts to be automatically resettable.

The parts comprising the normally rigid connection including bar 36 transmitting the force imparted to handle 22 to head 19, bar 12 and work-engaging member 10 to the work may be assembled in any suitable way. However, as illustrated in the drawings, pin 40 is used to hold these parts in position, thereby simplifying the assembly of the parts and making replacement of a part a simple matter. It will be observed that pin 40 is headed at one end and is provided with a groove at the other end to receive a spring ring 40' holding pin 40 in assembled position. The removal of ring 40' and pin 40 disconnects handle 22 and bar 36 from sleeve extension 42. Trip 66 and associate parts like rod 53, springs 55 and 59, sleeve 56, tubular member 60 will be free for removal, while housing 64, shuttle plate 66 and its spring 69 may be dropped out of chamber 65. It will be apparent that the assembly is as simple and will involve little labor. It is not tedious and the parts are designed to drop readily into their proper relative positions to be held assembled by the locking of pin 40 in position as illustrated in Fig. 4.

A further advantage of the arrangement of the parts of this aforesaid normally rigid connection is that should any parts wear and not be replaced, the friction caused thereby will not affect the operation of the device whether it be the torque measuring wrench specifically illustrated in the drawings as one possible embodiment of the invention, or any force transmitting device to which the invention will readily lend itself. As to this torque measuring wrench, it will be apparent any looseness of the parts due to wear will not affect the making of the normally rigid connection for transmitting the force imparted at the handle, or will not affect the operation of the spring bar in flexing, and the operation of the pointer and dial to indicate the extent of this flexing which acts to measure the torque applied at the work-engaging member to the work. Bar 36 will be tripped in the same way and the hammer blow effected to indicate or signal the application of a predetermined torque at the work.

Different forms of structure may be provided to accomplish the results of the invention disclosed. In Fig. 7, handle 80 is similarly mounted upon a bar 81 by a pin 82 fixedly attached to handle 80. Bar 81 is also pivotally carried upon a pin 83 secured in bifurcated sleeve 84, bar 81 lying crosswise of the bifurcated portion so that it moves outwardly of either opening 85 or 86 when swung about pins 82 and 83. Bar 81 is designed in the same manner and is provided with an arcuate notch 87 to receive a trip 88 slidably carried within a sleeve 89 of smaller diameter disposed within the bifurcated sleeve 84. A rod 90 extends outwardly of sleeve 89 and is provided with a head 91 lying therein and abutting against trip 88, there being a spring 92 urging this head 91 against the trip 88 to hold it against bar 81 to maintain the rigid connection transmitting the force imparted to the handle. Another coil spring 93 is disposed within sleeve 84 to urge the smaller sleeve 89 outwardly so that the end face 94 of the latter will be held against the end face 95 of bar 81 when maintaining the rigid connection. A fixed tubular member 96 is likewise seated in the inner end of sleeve 84 and also partly in head member 97. The parts of the trigger device cooperating with the end of rod 90 may be the same in this embodiment as in Figs. 1 to 6, inclusive. Shuttle plate 66 receives the tip of the rod 90 and is movable vertically in housing 64 by movement of cam member 62 of trigger 35 when the latter is actuated by trigger finger 26. This movement of plate 66 will bring the tip of rod 90 into registration with opening 72 to cause trip 88 to be forced out of notch 87 and arm 81 allowed to utilize the force being imparted to handle 80 to swing into a position about pins 82 and 83 to produce a hammer blow by striking against handle 80.

The force to keep trip 88 in notch 87 of bar 81 in this embodiment will not be as great as in the previous form, and consequently, spring 92 need not be as large as spring 54. Trip 88 is provided in two parts 98 and 99 having sloping cooperating faces adapted to produce frictional resistance resisting movement. This tends to keep these parts in position to maintain the rigid connection, but this connection will be readily broken as in the former case when plate 66 moves to bring the tip of rod 90 into opening 72.

In the embodiment disclosed in Fig. 8, the handle 102 is likewise mounted upon a bar 103 by a pin 104 fixed in handle 102. Bar 103 is also pivotally carried upon a pin 105 secured in the bifurcated sleeve 106. Bar 104 is provided in this instance with a V-opening (referred to hereinabove) 108 in its front face 107 adapted to receive a V-tip 109 at the end of a trip 110 arranged in this instance to include a chamber 111 in which the head 117 of rod 118 is disposed. A coil spring 119 encircles the rod 118 and is also disposed in chamber 111 to urge rod 118 forwardly in constant contact with trip 110 while spring 120 in sleeve 106 urges trip 110 forwardly so as to hold V-tip 109 in notch 108. Thus the smaller sleeve housing the trips in the other embodiment is made a part of the trip in this form and the chamber 111 is formed directly therein so that the spring 119 and the head 117 of the rod 118 will lie therein. A plate 121 may be placed upon rod 118 at head 117 for spring 119 to press thereagainst, while at the opposite end a plate 122 may be inserted in the chamber opening and the edge of the part 110 peened thereover as at 123 to hold the plate 122 in position. In all other respects, the parts are the same as in the previous forms and function in a like manner.

In Fig. 9 there is illustrated an embodiment employing another form of the invention. Handle 125 is mounted upon a bar 126 by a pin 127 fixed in handle 125. Bar 126 is also pivotally carried upon a pin 128 secured in bifurcated sleeve 129. An arcuate notch 130 in bar 126 is adapted to receive an arcuate knob 131 on the outer face 132 of trip 133 which is slidably movable in sleeve 129. At the rear end of sleeve 129, a smaller sleeve 134 is anchored, a portion extending in head member 135 if so desired. Within sleeve 134 is disposed concentrically arranged springs 135 and 136. Spring 135 is arranged to encircle a rod 137 adapted to be anchored in a member 138 having a tapered face 139 at its outer end adapted to bear against ball bearings 140 riding against the inner face of trip 133. Sleeve 134 is likewise provided with a tapered face 141 which also has the bearings 140 riding thereagainst. A sleeve 142 is carried upon the forward end of member 138 and the spring 136 bears thereagainst. Thus the bearings 142 are forced forwardly and toward the center against surface 139 of member 138, and thus the force to keep trip 133 against bar 126 to maintain the normally rigid connection need not be as great.

Another form of trigger device that may be used instead of that illustrated in Figs. 1 to 8, inclusive, is shown in Fig. 10. Instead of employing vertically slidable shuttle plate 66, a rotatable housing 145 is disposed in head member 135 and is provided with two openings 146 and 147 (Fig. 9) adapted to be brought alternately into registration with rod 137. A trigger 148 projects from housing 145 to be engaged by trigger arm 26 and moved in either direction depending upon the direction of rotation of handle 125 when grasped to apply torque to the work. Housing 145 is provided with a chamber 149 for receiving a torsion spring 150 anchored at one end by screw 151 and at the other end by screw 152. Obviously, housing 145 will be returned to its normal position with its trigger 148 lying longitudinally of the wrench when the trigger 148 is disengaged by trigger finger 26 and the force applied to the handle is released. When the force is released at the handle, it is apparent that the tip of the rod of this mechanism is withdrawn from either opening 146 or 147 and the housing 145 is then permitted to rotate to normal position.

Attention is directed to the fact that in this art the entire portion of the device from the end of the spring 12 to the end of the handle 22, which includes head 19 and sleeve extension 42, as shown in Figs. 1 to 6, inclusive, is often termed the handle member and the part which I have herein termed handle 22 is often called a grip member. On the other hand, this portion has also been broadly called a head member, in which event handle 22 may or may not be included as a part thereof. It will be understood, therefore, that the term "force applying member" as used herein is intended to include the handle, if it is provided, and all other parts going to make up the same, and that the hammer blow may be directed against any part thereof.

From the foregoing description, it will be apparent that an exceedingly novel structure, in a force transmitting device, is disclosed and that the mechanism forming a normal rigid force transmitting connection adapted to release itself and produce a hammer blow, by the force being transmitted, by a trigger device actuable to indicate the application of a predetermined torque at the work, or indicate the extent of the application of this force being transmitted, may be made and disposed of as a unit independently of the force transmitting device without departing from the scope of the invention. Although, in most force transmitting devices incorporating the invention, a torque measuring device may be employed, it will be understood that the invention has use in force transmitting devices not having a torque measuring device.

I believe that I am the first to provide a force transmitting connection that normally remains rigid to transmit force but which is adapted to be released to produce a hammer blow to the mechanism no matter where the hammer blow may be applied. This hammer blow is of a magnitude that leaves no uncertainty about its application to the mechanism when it is applied, and hence, it serves as a very effective signal, either audible or in a tactile sense. The parts are simple, easy to assemble and permit incorporation in any force transmitting device at a reasonable cost. The jar produced at the handle, if incorporated in a torque measuring wrench as disclosed herein, tends to facilitate the use of the wrench in that it adds to the speed at which the attendant handles the wrench and assures more accurate application of a predetermined torque at the work.

As a further application of the invention, its use to indicate a limited movement, straight or otherwise, of a device, such for example as a slide on a milling machine, or a shuttle on a grinder, will be apparent from the foregoing description. A suitably spaced element or the like may be used to effect a tripping action to produce the hammer blow against the structure to indicate a predetermined travel to the operator gripping the handle, so that it will act as a warning to cause him to bring the operation to a stop when a certain point in the movement is reached. In this connection, and for many similar uses, the portion of the structure disclosed herein beginning at the head 19 and extending rearwardly to and including the handle 22 may be employed, the tripping action occurring when a properly positioned trip element engages member 35. It will be apparent that such uses and modifications may be made without departing from the invention.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A tripping mechanism for indicating the application of a predetermined force adapted for use with a force transmitting mechanism which includes a handle member and a yieldably connected force applying member, said tripping mechanism comprising a normally rigid connection through which the force imparted to said handle member is transmitted to said force applying member, a releasable member forming a part of said means adapted to break said normally rigid connection and deliver a hammer blow to jar said handle member, said member comprising a bar pivotally mounted upon said handle and upon said force applying member, there being means for restraining said bar to prevent said bar from swinging about its said pivotal mountings.

2. A force transmitting mechanism comprising a force applying member, a work-engaging member, a torque measuring device interposed between said force applying member and said work-engaging member, means for momentarily releasing the force of the load being applied by said force applying member and for utilizing the force to create a hammer blow to jar said force applying member, a trigger device for operating said releasing means, and means actuable through movement of said torque measuring device to actuate said trigger device.

3. A force transmitting mechanism comprising a force applying member having a grip portion, a work-engaging member, a torque measuring device interposed between said force applying member and said work-engaging member, means for momentarily releasing the force of the load being applied at said grip portion and for utilizing the force to create a hammer blow to jar said grip portion, a trigger device carried by said force applying member for operating said releasing means, and means actuable through movement of said torque measuring device to actuate said trigger device.

4. A force transmitting mechanism comprising a force applying member including a handle member, a work-engaging member connected to said force applying member, a normally rigid connection between said handle member and said force applying member, said connection including a releasable member adapted to be actuated to break said connection upon the application of a predetermined torque at said work-engaging member to effect a hammer blow against said handle member, trigger means for said releasing member, and a part indicating the application of a predetermined torque at said work-engaging member for tripping said trigger means.

5. A force transmitting mechanism comprising a manually operable force applying member, a work-engaging member connected to said manually operable force applying member, there being an overload release connection between said members including a part through which force imparted to said manually operable force applying member is transmitted to said work-engaging member, said part forming a part of a rigid connection for transmitting the force and adapted upon release to strike said force applying member, and actuating means for causing said part to break said rigid connection and deliver a hammer blow to jar said manually operable force applying member there being means controlled by the torque at said work-engaging member for operating said actuating means, said actuating means including provisions for automatically resetting said part to restore said rigid connection when the force applied to said manually operable force applying member is discontinued.

6. A force transmitting mechanism comprising a manually operable force applying member, a work-engaging member connected to said manually operable force applying member, there being an overload release connection between said members including a part through which the force imparted to said manually operable force applying member is transmitted to said work-engaging member, said part forming a part of a rigid connection for transmitting the force and adapted upon release to strike said force applyig member, said rigid connection including a trip normally restraining said part against breaking said connection, and a trigger device controlling said trip whereby said trip releases said part to break said connection and cause said part to deliver a hammer blow to jar said manually operable force applying member upon the application of a predetermined torque at said work-engaging member by the force imparted to said manually operable force applying member.

7. A force transmitting mechanism comprising a manually operable force applying member, a work-engaging member connected to said manually operable force applying member, there being included a part through which the force imparted to said manually operable force applying member is transmitted to said work-engaging member, said part being pivotally related to said manually operable force applying member but normally forming a part of a rigid connection for transmitting the force, a trip for restraining said part against pivotal movement, spring means for urging said trip against said part, and a movable member for releasing said spring means and said trip whereby to free said part and effect a hammer blow thereby to jar said manually operable force applying member, said movable member being operable upon the application of a predetermined torque at said work-engaging member by the force imparted to said manually operable force applying member.

8. A torque measuring wrench comprising a head member, a work-engaging member pivotally supported adjacent one end of said head member, a spring yieldably opposing relative rock movement of said work-engaging member and said head member, means for indicating the force applied to the work by registering the extent of the relative rock movement of said work-engaging and said head members, a handle member, a connection between said handle member and said head member for transmitting the force applied at the handle to the head member and transmitted through said spring and work-engaging member, said connection including releasing means for imparting a blow to jar said handle member, said releasable means being actuable by said indicating means.

9. A torque measuring wrench comprising a work-engaging member, a head member adapted for rock movement relative to said work-engaging member, a spring yieldably opposing said movement, means for indicating the force applied to the work by registering the extent of relative rock movement of said work-engaging member and said head member, a handle member pivotally mounted at one end of said head member, the pivotal mounting for said handle member including a bar pivoted upon one end of said head member and to said handle member, a trip for normally restraining said bar from moving relative to said head and handle members, a trigger actuable by said indicating means upon the application of a predetermined torque at said work-engaging member, the movement of said trigger releasing said trip and said bar, the release of said bar about its pivotal connections with said head member and said handle member creating a hammer blow to jar said handle member.

10. A torque measuring wrench comprising a work-engaging member, a head member adapted for rock movement relative to said work-engaging member, a spring yieldably opposing said movement, means for indicating the force applied to the work by registering the extent of relative rock movement of said work-engaging member and said head member, a handle member at one end of said head member, a connection between said handle member and said head member including a bar, means for restraining said bar from moving relative to said head member whereby said bar transmits to said head member the force applied to said handle member, and means for releasing said restraining means to break said force transmitting connection formed by said bar and cause the bar to create a hammer blow to jar said handle member, said releasing means being actuable by said indicating means.

11. A torque measuring wrench comprising a work-engaging member, a head member adapted for rock movement relative to said work-engaging member, a spring yieldably opposing said movement, a handle member at one end of said head member, a bar forming the connection between said handle member and said head member, means for restraining said bar from moving relative to said head member whereby said bar transmits to said head member the force applied to said handle member, and means operated by a predetermined torque at said work-engaging member reflected by the yield of said spring for releasing said restraining means to break said force transmitting connection formed by said bar and cause the bar to create a hammer blow to jar said handle member, said releasing means being operated by a part actuated by the relative rock movement between said work-engaging member and said head member.

12. A torque measuring wrench comprising a work-engaging member, a head member adapted for rock movement relative to said work-engaging member, a spring bar yieldably opposing said movement, a handle member at one end of said head member, means forming a connection between said handle member and said head member, means for restraining said connecting means from movement relative to said head member whereby said connecting means transmits to said head member the force applied to said handle member, and means operated by a predetermined torque at said work-engaging member reflected by the yield of said spring for releasing said restraining means to break said force transmitting connection and cause said connecting means to effect a hammer blow to jar said handle member, said releasing means being operated by a part actuated by the relative rock movement between said work-engaging member and said head member.

13. A torque measuring wrench comprising a work-engaging member, a head member mounted for rock movement about said work-engaging member by means of a spring bar disposed between said head member and said work-engaging member and yieldably opposing relative rock movement between said members, a handle member carried by said head member, a normally rigid connection for transmitting to said head member the force applied to said handle member, and means including a part operable by the flexing of said spring bar between said head member and said work-engaging member for breaking said connection upon the application of a predetermined torque at said work-engaging member, said connection when broken utilizing the force of the load being applied to create a hammer blow to jar said handle member, said means including provisions for automatically resetting the same to restore said rigid connection by the release of the force applied from said handle member.

14. A torque measuring wrench comprising a work-engaging member, a head member, a spring bar disposed between said head member and said work-engaging member for yieldably opposing relative rock movement of said head member and said work-engaging member, means for indicating the force applied to the work by registering the extent of relative rock movement of said work-engaging member and said head member, a handle member at one end of said head member, a mounting for said handle member, said mounting including a bar normally forming a rigid connection between said head member and said handle member, a spring pressed trip for restraining movement of said bar relative to said head member, a projection on said trip, a slidable plate, said plate having an aperture therein adapted for registration and the reception of said projection, and a pivotally mounted trigger adapted to be actuated by said indicating means to force said slidable plate into position to cause said projection to register with and be received in said aperture to break said rigid connection formed by said bar.

15. A torque measuring wrench comprising a work-engaging member, a head member, a spring bar disposed between said head member and said work-engaging member for yieldably opposing relative rock movement of said head member and said work-engaging member, means for indicating the force applied to the work for registering the extent of relative rock movement of said work-engaging member and said head member, a handle member at one end of said head member, a mounting for said handle member, said mounting including a member normally forming a rigid connection between said head member and said handle member, a spring pressed trip for restraining movement of said member relative to said head member, a projection on said trip, a spring pressed sleeve housing said trip, said projection extending through said sleeve, a movable plate having an aperture therein adapted for registration and the reception of said projection, and a pivotally mounted trigger adapted to be actuated by said indicating means to force said movable plate into position to cause said projection to register with and be received in said aperture to break said rigid connection formed by said member.

16. A torque measuring wrench comprising a work-engaging member, a head member, a spring bar disposed between said head member and said work-engaging member for yieldably opposing relative rock movement of said head member and said work-engaging member, means for indicating the force applied to the work for registering the extent of relative rock movement of said work-engaging member and said head member, a handle member at one end of said head member, a mounting for said handle member, said mounting including a member normally forming a rigid connection between said head member and said handle member, a spring pressed trip for restraining movement of said member relative to said head member, a projection on said trip, a movable plate having an aperture therein adapted for registration and the reception of said projection, and a pivotally mounted trigger adapted to be actuated by said indicating means to force said movable plate into position to cause said projection to register with and be received in said aperture to break said rigid connection formed by said member.

17. A torque measuring wrench comprising a work-engaging member, a head member, a spring bar disposed between said head member and said work-engaging member for yieldably opposing relative rock movement of said head member and said work-engaging member, means for indicating the force applied to the work for registering the extent of relative rock movement of said work-engaging member and said head member, a handle member at one end of said head member, a mounting for said handle member, said mounting including a member normally forming a rigid connection between said head member and said handle member, a spring pressed trip for restraining movement of said member relative to said head member, a projection on said trip, a rotatable body disposed in said head member, said rotatable body having an aperture therein adapted for the registration and the reception of said projection, and a trigger adapted to be actuated by said indicating means to move said rotatable body into a position to cause said projection to register with and be received in said aperture to break said rigid connection formed by said member.

18. A force transmitting mechanism comprising a work-engaging member, a manually operable force applying member connected thereto through the intermediary of an overload release mechanism, a torque measuring device operatively disposed relative to said work-engaging member and said manually operable force applying member, and means actuable through movement of a part of said torque measuring device for momentarily releasing said mechanism and utilizing the applied force to create a hammer blow against a part of said force transmitting mechanism.

19. A force transmitting mechanism comprising a manually operable force applying member, a work-engaging member connected to said manually operable force applying member, an overload release operatively disposed relative to said force applying member and said work-engaging member to deliver a hammer blow against said manually operable member upon being released, means for indicating the force applied to the work by said work-engaging member, and means for tripping said overload release by movement of a part of said indicating means.

20. A force transmitting mechanism comprising a manually operable force applying member, a work-engaging member connected to said force applying member, an over-load release through which force imparted to said manually operable member is transmitted to said work-engaging member, said over-load release including a releasable member adapted to effect a hammer blow to jar said manually operable force applying member, means for indicating the torque applied at said work-engaging member by the force transmitted through said over-load release, and a trip actuable at a predetermined setting for releasing said releasing member, said trip being actuable through the movement of said torque indicating means.

21. A torque measuring wrench comprising a work-engaging member, a head member mounted for rock movement about said work-engaging member by means of a spring bar disposed between said head member and said work-engaging member and yieldably opposing relative rock movement between said members, a handle member carried by said head member, a normally rigid connection for transmitting to said head member the force applied to said handle member, and means actuable through the flexing movement of said spring bar for breaking said connection upon the application of a predetermined torque at said work-engaging member, said connection including means to deliver a hammer blow when said connection is broken, said connection when broken utilizing the force of the load being applied to create said hammer blow to jar said handle member.

22. Connecting mechanism for use between parts of a force transmitting device comprising means for connecting said mechanism to each part and to provide a normally rigid connection between these parts to transmit force from one part to the other part, said mechanism including a member adapted to be urged by the force transmitted to move in the direction of the force, a blocking member at one end of said movable member to prevent such movement of said movable member, a releasable member at the opposite end of said movable member, said releasable member being held by said movable member while the latter is locked to provide a force transmitting connection at said end between said connecting mechanism and one of said parts of said force transmitting device, and a tripping device for said blocking member adapted to cause said blocking member to free said movable member for movement in the direction of the force, the movement of said movable member releasing said releasable member to cause said releasing member to deliver a hammer blow against one of said parts of said force transmitting device.

23. Connecting mechanism for use between parts of a force transmitting device comprising means for connecting said mechanism to each part and to provide a normally rigid connection between these parts to transmit force from one part to the other, said mechanism including a member adapted to be urged by the force transmitted to move in the direction of the force, a blocking member to prevent such movement of said movable member, a releasable member to provide a force transmitting connection between said movable member and one of said parts of said force transmitting device, and a tripping device for said blocking member adapted to cause said blocking member to free said movable member for movement in the direction of the force, the movement of said movable member releasing said releasable member and delivering a hammer blow at the time of said release against one of said parts of said force transmitting device.

24. Connecting mechanism for use between parts of a force transmitting device comprising means for connecting said mechanism to each part to effect a normally rigid connection between these parts whereby to transmit force from one part to the other part, said mechanism including a member movable forwardly in the direction of force transmitted, a blocking member preventing such forward movement of said member, a trip to actuate said blocking member to allow said movable member to move forwardly, and a releasable member adapted to be released by the forward movement of said movable member causing a hammer blow at the time of said release against one of the parts of said force transmitting device.

25. A force transmitting mechanism comprising a force applying member including a handle member, a work-engaging member, a torque measuring device operatively disposed relative to said force applying member and said work-engaging member, a normally rigid connection between said handle and said force applying member by means of which the force imparted to said handle member is transmitted to said force applying member, a releasable member forming a part of said normally rigid connection and through which the force imparted to said handle member is transmitted to said force applying member adapted to break said normally rigid connection and deliver a hammer blow to jar said handle member, means for actuating said releasable member, and a part actuable by relative movement between said work-engaging member and said force applying member for operating said actuating means.

26. A torque measuring wrench comprising a head member, a work-engaging member pivoted adjacent one end of said head member, a spring bar disposed between said head member and said work-engaging member and yieldably opposing relative rock movement between said members, a handle member at the opposite end of said head member, a normally rigid connection between said handle member and said head member adapted to comprise a force transmitting connection, said connection including means to deliver a hammer blow against said handle member, and means for releasing said normally rigid connection upon the application of a predetermined torque at said work-engaging member whereby to break said normally rigid connection and effect thereby a hammer blow directly against said handle member, said releasing means being actuated by a part actuated by the relative rock movement between said work-engaging member and said head member.

PAUL A. STURTEVANT.